US009232530B2

(12) United States Patent
Wang et al.

(10) Patent No.: US 9,232,530 B2
(45) Date of Patent: Jan. 5, 2016

(54) MANAGING A RADIO TRANSMISSION BETWEEN A BASE STATION AND A USER EQUIPMENT (75) Inventors: Yuanye Wang, San Diego, CA (US); Klaus Ingemann Pedersen, Aalborg (DK)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 14/365,132

(22) PCT Filed: Dec. 20, 2011

(86) PCT No.: PCT/EP2011/073370
§ 371 (c)(1),
(2), (4) Date: Jun. 13, 2014

(87) PCT Pub. No.: WO2013/091679
PCT Pub. Date: Jun. 27, 2013

(65) Prior Publication Data
US 2015/0031383 A1    Jan. 29, 2015

(51) Int. Cl.
*H04W 72/00* (2009.01)
*H04W 72/08* (2009.01)
(Continued)

(52) U.S. Cl.
CPC ........... *H04W 72/085* (2013.01); *H04B 7/0413* (2013.01); *H04B 7/0486* (2013.01); *H04W 72/0426* (2013.01)

(58) Field of Classification Search
CPC ........... H04W 72/085; H04W 72/0426; H04B 7/0486; H04B 7/013
USPC .................. 455/452.1, 507, 101, 422.1, 522; 370/329, 252, 311, 338, 343
See application file for complete search history.

(56) References Cited

U.S. PATENT DOCUMENTS

2008/0013610 A1* 1/2008 Varadarajan ......... H04B 7/0417
375/221
2008/0232449 A1* 9/2008 Khan ................ H04L 25/03343
375/220
(Continued)

FOREIGN PATENT DOCUMENTS

WO    WO 2011/050755 A1    5/2011

OTHER PUBLICATIONS

3GPP TSG RAN WG1 Meeting #57, San Francisco, USA, May 4-8, 2009, R1-091976, "Multi-cell PMI coordination for downlink CoMP", ETRI, 4 pgs.
(Continued)

*Primary Examiner* — Khai M Nguyen
(74) *Attorney, Agent, or Firm* — Harrington & Smith (57) ABSTRACT It is described a method for managing a radio transmission between a base station and a user equipment, wherein a communication channel is used for the radio transmission, wherein the communication channel includes a plurality of channel resources and is based on a MIMO transmission scheme. The method includes dividing the plurality of channel resources into a set of channel resource regions, assigning a MIMO rank to each channel resource region, wherein the MIMO rank is indicative for a number of channel resources to be used for a radio transmission within a corresponding channel resource region, selecting a channel resource region for the radio transmission between the base station and the user equipment, and managing the radio transmission between the base station and the user equipment based on the selected channel resource region and the corresponding assigned MIMO rank.

11 Claims, 2 Drawing Sheets (51) Int. Cl.
*H04B 7/04* (2006.01)
*H04W 72/04* (2009.01)

(56) References Cited

U.S. PATENT DOCUMENTS

| | | | | |
|---|---|---|---|---|
| 2009/0074099 | A1* | 3/2009 | Zheng | H04L 1/0017 375/267 |
| 2009/0202014 | A1 | 8/2009 | Mujtaba et al. | 375/267 |
| 2010/0002598 | A1* | 1/2010 | Pan et al. | 370/252 |
| 2010/0099364 | A1* | 4/2010 | Yang et al. | 455/69 |
| 2011/0032839 | A1* | 2/2011 | Chen | H04B 7/024 370/252 |
| 2013/0121312 | A1* | 5/2013 | Roman | H04B 7/0486 370/335 |
| 2014/0064392 | A1* | 3/2014 | Jonsson et al. | 375/267 |

OTHER PUBLICATIONS

3GPP TSG-RAN WG1 #57, May 4-8, 2009, San Francisco, CA, USA, R1-092284, "TP for feedback in support of DL CoMP for LTE-A TR", Qualcomm Europe, 4 pgs.

* cited by examiner

MANAGING A RADIO TRANSMISSION BETWEEN A BASE STATION AND A USER EQUIPMENT

FIELD OF INVENTION

The present invention relates to the field of cellular networks and in particular to cellular networks using multiple input multiple output (MIMO) transmission.

ART BACKGROUND

In cellular network systems, multiple-input and multiple-output, or MIMO may be used for improving the communication performance by using multiple antennas at both the transmitter and receiver. MIMO rank adaptation may be employed at the transmitter side as part of the link adaptation process to make best use of the multiple transmit antennas. If the user equipment (UE) channel quality is good, multiple data streams could be sent to the UE using high rank transmission. If the channel is poor, a low transmission rank may exploit the MIMO diversity gain to improve the received signal to interference plus noise ratio (SINR). At the receiver side, the SINR can be improved by combining the signals from multiple receiving antennas. An IRC (interference rejection combining) receiver may exploit the interference correlation across the receiving antennas to suppress the strongest interferers and maximize the SINR. It may experience each MIMO rank as one independent interference source. Therefore, its performance may be significantly penalized when high rank transmissions are applied at interfering base stations or eNBs.

An IRC receiver with $N_{rx}$ antennas can ideally suppress up to $N_{rx}-1$ strongest interferers. If rank 1 transmission is used in all neighboring cells, the interference from $N_{rx}-1$ neighboring cells can be suppressed. It should be noted that more than one cell can be provided by a single base station. However, if neighboring cells are using high rank transmission, one interferer corresponds to one MIMO data-stream, and the IRC receiver can suppress interference from only $(N_{rx}-1)/N_{rank}$ neighboring cells. Therefore, the benefit of using IRC may be reduced. This effect may be significant for cell-edge UEs who suffer from severe inter-cell interference.

There may be a need for an improved system and method being adapted to reduce the interferences between neighboring cells and to increase the benefit of using an IRC receiver.

SUMMARY OF THE INVENTION

This need may be met by the subject matter according to the independent claims. Advantageous embodiments of the present invention are described by the dependent claims.

According to a first aspect of the invention there is provided a method for managing a radio transmission between a base station and a user equipment, wherein a communication channel is used for the radio transmission, wherein the communication channel comprises a plurality of channel resources and is based on a multiple input multiple output radio transmission scheme. The method comprises dividing the plurality of channel resources into a set of channel resource regions, assigning a multiple input multiple output rank to each channel resource region, wherein the multiple input multiple output rank is indicative for a number of channel resources to be used for a radio transmission within a corresponding channel resource region, selecting a channel resource region for the radio transmission between the base station and the user equipment, and managing the radio transmission between the base station and the user equipment based on the selected channel resource region and the corresponding assigned multiple input multiple output rank.

This aspect of the invention is based on the idea to improve the multiple input multiple output (MIMO) rank adaptation.

MIMO rank adaptation may be employed at the transmitter side as part of the link adaptation process to make best use of the multiple transmit antennas: if the user equipment (UE) channel quality is good, multiple data streams could be sent to the UE using high rank transmission; if the channel is poor, a low transmission rank may exploit the MIMO diversity gain to improve the received signal to interference plus noise ratio (SINR). At the receiver side, the SINR can be improved by combining the signals from multiple receiving antennas. For instance, an interference rejection combining (IRC) receiver may be used to exploit the interference correlation across the receiving antennas to suppress the strongest interferers and maximize the SINR. Interference rejection combining (IRC) is a technique used in an antenna diversity system to suppress co-channel interference by using the cross covariance between the noise in diversity channels. Such a IRC receiver may experience each MIMO rank as one independent interference source. Therefore, its performance may be significantly penalized when high rank transmissions are applied at interfering eNBs.

The idea of this method is to use a time and/or frequency domain pattern for MIMO rank. By doing so, in particular the cell-edge UEs, which may support lower rank transmission, may be scheduled on same resources where neighboring cells are also using lower rank transmission. Thereby, the gain of IRC may be maximized.

MIMO in this context may denote a multipath system, which means multiple reflections create many paths between antennas. The cumulative power of those multiple reflections can be used to significantly improve wireless performance. On the transmit side, any single antenna can transmit signals, which can then be deflected and diffracted into many radio wave branches. On the receive side, each antenna can receive many of these radio wave branches, in which case each antenna can be viewed as an independent "observer" that performs independent sampling, improving signal-to-noise ratio (SNR). Within this multi-path environment, a wireless channel can be classified in terms of channel rank, or how many independent paths it can support between its transmit and receive antennas. The higher the channel rank or rank of the MIMO transmission, the more independent paths are used.

The term "communication channel" in this context may denote a wireless channel providing a plurality of independent paths by using channel resources. A channel resource may be a time and/or frequency domain resource and may be divided into sets of different channel resource regions. The channel resource regions may differ in dependence which MIMO rank they are supporting.

The term "MIMO rank" may denote a rank of the transmission and may be indicative of the number of independent data streams used for transmission.

The term "managing the transmission" may refer to configuring the transmission on the base station side by adapting the transmitter to use the selected MIMO rank. It may further refer to a configuration of the UE to support the selected MIMO rank.

The term "base station" in this context may denote any kind of physical entity being able to hold one or more cells. A base station in this context may be any kind of network device providing the required functionality for the method, it may also be a transceiver node in communication with a centralized entity. The base station may be for example an eNodeB or eNB. In particular, such a base station may comprise an IRC receiver.

According to an embodiment of the invention, within a channel resource region, a multiple input multiple output rank is used for radio transmission being equal to or being lower than the multiple input multiple output rank being assigned to the channel resource region.

Each resource region may support up to a specific MIMO rank. However, also a lower MIMO rank may be used in the resource regions. This means that UEs associated with a transmission with a low MIMO rank may be served in resources allowing high rank transmission.

According to a further embodiment of the invention, selecting a channel resource region for the radio transmission between the base station and the user equipment comprises determining a channel condition of the communication channel between the base station and the user equipment, and selecting a multiple input multiple output rank based on the determined channel condition.

Cell-edge UEs may have a poor channel quality and may support only low MIMO ranks. Thus, they may be associated with channel resource regions being assigned to low MIMO ranks.

According to a further embodiment of the invention, the method further comprises exchanging a signal between the base station and a further base station, wherein the signal comprises information of the set of channel resource regions and the corresponding multiple input multiple output ranks.

According to this embodiment, neighboring base stations may agree to follow the same MIMO rank adaptation pattern. The pattern may divide the time and/or frequency domain resources into several channel resource regions as described above. Each region may support up to a certain MIMO rank and each base station may be informed about this pattern.

According to a further embodiment of the invention, the method further comprises managing a radio transmission between the further base station and a further user equipment based on the received information.

Based on the received information, the base station and the further base station may use for each channel resource region a MIMO rank for transmission that is not higher than what is supported according to the pattern.

According to a further embodiment of the invention, the method further comprises determining a channel condition of the communication channel between the further base station and the further user equipment, and selecting a multiple input multiple output rank based on the determined channel condition, wherein, in case the selected multiple input multiple output rank is assigned to the same channel resource region being selected for the radio transmission between the base station and the user equipment, managing the radio transmission between the further base station and the further user equipment comprises using the same channel resource region as selected for the radio transmission between the base station and the user equipment.

By forcing neighboring cells to use the same resources for the same, in particular low, rank transmission, it may be ensured that for instance cell-edge UEs may always experience low rank interference. Therefore, the gain of IRC may be preserved.

The cell-center UEs may be less affected by inter-cell interference. The IRC gain may be marginal for these users. They may support high rank transmission and may thus be scheduled when neighboring cells are using high rank transmission.

According to a further embodiment of the invention, X2 signalling is used for exchanging the signal between the base station and the further base station.

A new X2 signalling between eNBs may be introduced. In particular, an eNB or base station might be able to inform its neighboring eNBs, on which resources it plans to primary schedule users with a certain rank in the following. Such information could be signalled to neighboring eNBs informing them that, in the future, users with rank X will primarily be scheduled at certain PRBs (frequency domain information) or during certain time-instances (time-domain information). Thus, if an eNB receives information that neighboring cells primary schedule rank 1 users at certain resources, it may then aim at scheduling its users that are most sensitive to neighbor cell interference on the same resources, as the IRC may then have maximum effects. Similarly, X2 signalling could also be introduced that allows an eNB to signal to its neighbors that it recommends them to use maximum rank X transmission at certain resources. Thus, X2 signalling between eNBs may be used to allow them to signal anticipated resources for certain rank transmissions in future, as well as signalling to recommend at which resources for neighbors to use maximum rank X transmission.

According to a further embodiment of the invention, dividing the plurality of channel resources into a set of channel resource regions is based on a frequency and/or time domain pattern.

The channel resources may be divided in time domain, frequency domain or a combination of both. This may mean that specific frequencies or time instances are assigned to specific MIMO ranks.

According to a further embodiment of the invention, the method further comprises determining an actual load of the selected channel resource region, and, if the actual load is above a predefined threshold, selecting a different channel resource region, to which a higher multiple input multiple output rank than the multiple input multiple output rank of the selected channel resource region is assigned.

According to this embodiment, in a channel resource region supporting up to rank k, a base station can still benefit from MIMO rank adaptation between rank 1 and k. UEs with poor channel quality may still be served in resources allowing high rank transmission. This may avoid the risk of unutilized resources if most of the UEs have poor channel quality.

According to a second aspect of the invention, there is provided a base station for managing a radio transmission between the base station and a user equipment, wherein a communication channel is used for the radio transmission, wherein the communication channel comprises a plurality of channel resources and is based on a multiple input multiple output transmission scheme. The base station comprises a control unit being adapted to divide the plurality of channel resources into a set of channel resource regions, being adapted to assign a multiple input multiple output rank to each channel resource region, wherein the multiple input multiple output rank is indicative for a number of channel resources to be used for radio transmission within a corresponding channel resource region, and being adapted to select a channel resource region for the radio transmission between the base station and the user equipment. The base station further comprises a managing unit being adapted to manage the radio transmission between the base station and the user equipment based on the selected channel resource region and the corresponding assigned multiple input multiple output rank.

The base station may be any type of access point or point of attachment, which is capable of providing a wireless access to a cellular network system. Thereby, the wireless access may be provided for a user equipment or for any other network element, which is capable of communicating in a wireless manner. The base station may be an eNodeB, eNB, home NodeB or HNB, or any other kind of access point.

The base station may comprise a receiving unit, for example a receiver as known by a skilled person. The base station may also comprise a transmitting or sending unit, for example a transmitter. The receiver and the transmitter may be implemented as one single unit, for example as a transceiver. The transceiver or the receiving unit and the sending unit may be adapted to communicate with the user equipment via an antenna.

In the context of this description, the base station may comprise more than one antenna to be able to support multiple input multiple output (MIMO) transmissions. MIMO rank adaptation may be employed at the transmitter side (of the base station) as part of the link adaptation process to make best use of the multiple transmit antennas. If the user equipment (UE) channel quality is good, multiple data streams could be sent to the UE using high rank transmission. If the channel is poor, a low transmission rank may exploit the MIMO diversity gain to improve the received signal to interference plus noise ratio (SINR). At the receiver side (of the base station), the SINR can be improved by combining the signals from multiple receiving antennas. An IRC (interference rejection combining) receiver may exploit the interference correlation across the receiving antennas to suppress the strongest interferers and maximize the SINR. It may effectively experience each MIMO rank as one independent interference source. Therefore, its performance may be significantly penalized when high rank transmissions are applied at interfering eNBs.

The receiver of the base station may be such an IRC receiver. An IRC receiver with $N_{rx}$ antennas can ideally suppress up to $N_{rx}-1$ strongest interferers. If rank 1 transmission is used in all neighboring cells, the interference from $N_{rx}-1$ neighboring base stations can be suppressed. However, if neighboring cells are using high rank transmission, one interferer corresponds to one MIMO data-stream, and the IRC receiver can suppress interference from only $(N_{rx}-1)/N_{rank}$ neighboring stations.

To reduce these negative effects, the base station may further comprise a control unit being adapted to divide the plurality of channel resources into a set of channel resource regions, being adapted to assign a multiple input multiple output rank to each channel resource region, wherein the multiple input multiple output rank is indicative for a number of channel resources to be used for transmission within a corresponding channel resource region, and being adapted to select a channel resource region for the transmission between the base station and the user equipment.

The base station further comprises a managing unit being adapted to manage the transmission between the base station and the user equipment based on the selected channel resource region and the corresponding assigned multiple input multiple output rank. The control unit and the managing unit may be implemented as single units or may be implemented for example as part of a standard control unit, like a CPU or a microcontroller.

According to a third aspect of the invention, there is provided a user equipment being adapted to communicate with a base station as described above.

The user equipment (UE) may be any type of communication end device, which is capable of connecting with the described base station. The UE may be in particular a cellular mobile phone, a Personal Digital Assistant (PDA), a notebook computer, a printer and/or any other movable communication device.

The user equipment may comprise a receiving unit or receiver which is adapted for receiving signals from the base station. The user equipment may comprise a transmitting unit for transmitting signals. The transmitting unit may be a transmitter as known by a skilled person. The receiver and the transmitting unit may be implemented as one single unit, for example as a transceiver. The transceiver or the receiver and the transmitting unit may be adapted to communicate with the base station via an antenna.

As described in the context of the base station, the UE may support MIMO transmissions. The receiver of the UE may thus also be an IRC receiver.

The user equipment may comprise a configuration unit for configuring the transmission based on information received from the base station. Such a configuration unit may be adapted to configure the user equipment to transmit according to the selected MIMO rank in the corresponding channel resource regions. The configuration unit of the user equipment may be implemented for example as part of a control unit, like a CPU or a microcontroller. The configuration unit and the transceiver may be coupled or may be implemented as one single unit.

According to a fourth aspect of the invention, there is provided a cellular network system. The cellular network system comprises a base station as described above.

Generally herein, the method and embodiments of the method according to the first aspect may include performing one or more functions described with regard to the second, third or fourth aspect or an embodiment thereof. Vice versa, the base station, the user equipment or the cellular network system and embodiments thereof according to the second, third and fourth aspect may include units or devices for performing one or more functions described with regard to the first aspect or an embodiment thereof.

According to a fifth aspect of the herein disclosed subject-matter, a computer program for managing a transmission between a base station and a user equipment is provided, the computer program being adapted for, when executed by a data processor assembly, controlling the method as set forth in the first aspect or an embodiment thereof.

As used herein, reference to a computer program is intended to be equivalent to a reference to a program element and/or a computer readable medium containing instructions for controlling a computer system to coordinate the performance of the above described method.

The computer program may be implemented as computer readable instruction code by use of any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded.

The herein disclosed subject matter may be realized by means of a computer program respectively software. However, the herein disclosed subject matter may also be realized by means of one or more specific electronic circuits respectively hardware. Furthermore, the herein disclosed subject matter may also be realized in a hybrid form, i.e. in a combination of software modules and hardware modules.

In the above there have been described and in the following there will be described exemplary embodiments of the subject matter disclosed herein with reference to a cellular network system, a base station, a user equipment and a method of managing a transmission between the base station and a user equipment. It has to be pointed out that of course any combination of features relating to different aspects of the herein disclosed subject matter is also possible. In particular, some embodiments have been described with reference to apparatus type embodiments whereas other embodiments have been described with reference to method type embodiments. However, a person skilled in the art will gather from the above and the following description that, unless otherwise notified, in addition to any combination of features belonging to one aspect also any combination between features relating to different aspects or embodiments, for example even between features of the apparatus type embodiments and features of the method type embodiments is considered to be disclosed with this application.

The aspects and embodiments defined above and further aspects and embodiments of the present invention are apparent from the examples to be described hereinafter and are explained with reference to the drawings, but to which the invention is not limited.

BRIEF DESCRIPTION OF THE DRAWING

It is noted that in different figures, similar or identical elements are provided with the same reference signs.

DETAILED DESCRIPTION

In the following, embodiments of the herein disclosed subject matter are illustrated with reference to the drawings and reference to aspects of current standards, such as LTE. However, such reference to current standards is only exemplary and should not be considered as limiting the scope of the claims.

Figure 1:
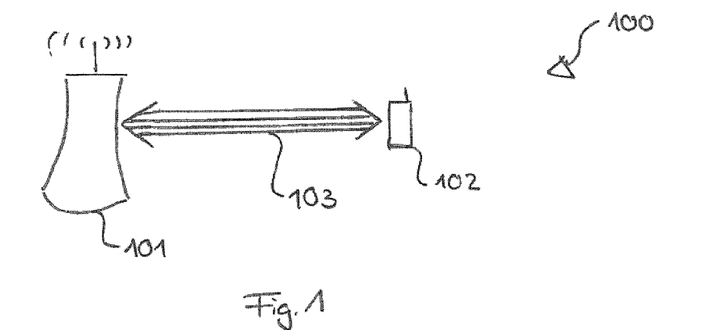
FIG. 1 shows a cellular network system according to an exemplary embodiment of the present invention.

FIG. 1 shows a cellular network system 100. A user equipment 102 within the cellular network system is served by a base station 101. The base station or eNB 101 and the user equipment or UE 102 communicate via a communication channel 103.

The communication channel comprises a plurality of channel resources, in time and/or frequency domain. For a radio transmission between the base station and the UE, a multiple input multiple output (MIMO) transmission scheme may be applied.

The plurality of channel resources is divided into a set of different channel resource regions. A MIMO rank is assigned, by the base station, to each channel resource region, wherein the MIMO rank is indicative for a number of channel resources to be used for a radio transmission within a corresponding channel resource region.

The base station 101 selects a channel resource region for the radio transmission between the base station and the user equipment. The selection can be based, inter alia, on a channel condition of the channel between the base station and the UE. The radio transmission between the base station and the user equipment can then be managed based on the selected channel resource region and the corresponding assigned multiple input multiple output rank. For a low condition or quality, a channel resource region with a corresponding low MIMO rank may be selected, whereas for a high quality, a channel resource region with a corresponding higher MIMO rank can be selected.

In common systems, MIMO rank adaptation can be employed at the transmitter side as part of the link adaptation process to make best use of multiple transmit antennas. If the UE channel quality is good, multiple data streams could be sent to the UE using high rank transmission. If the channel is poor, a low transmission rank can exploit the MIMO diversity gain to improve the received SINR. At the receiver side, the SINR can be improved by combining the signals from multiple receiving antennas. An IRC receiver can exploit the interference correlation across the receiving antennas to suppress the strongest interferers and maximize the SINR. It can effectively experience each MIMO rank as one independent interference source. Therefore, its performance can be significantly penalized when high rank transmissions are applied at interfering eNBs or base stations.

According to the described method and system of the invention, neighboring base stations can use a common time/frequency domain pattern for MIMO rank. By doing so, the cell-edge UEs (supporting lower rank transmission) can be scheduled on the same resources where neighboring cells are also using lower rank transmission. Thereby, the gain of IRC can be maximized.

An IRC receiver with $N_{rx}$ antennas, as it can be used in the base station 101, can ideally suppress up to $N_{rx}-1$ strongest interferers. If rank 1 transmission is used in all neighboring cells, the interference from $N_{rx}-1$ neighboring base stations can be suppressed. However, if neighboring cells are using high rank transmission, one interferer corresponds to one MIMO data-stream, and the IRC receiver can suppress interference from only $(N_{rx}-1)/N_{rank}$ neighboring stations. Therefore, the benefit of using IRC can be reduced. This effect is significant for cell-edge UEs who suffer from severe inter-cell interference.

Figure 2:
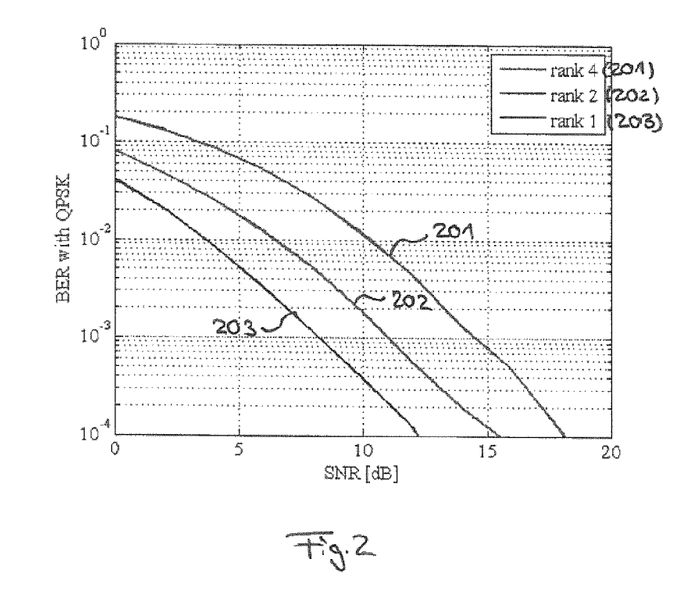
FIG. 2 shows a graph illustrating different BERs for different transmission ranks.

FIG. 2 shows the link level signal to noise ratio (SNR) versus bit error rate (BER) performance of a 4-antenna IRC receiver. The serving base station is assumed to have a single transmit antenna and send QPSK signals. Only one interfering base station is considered, with 4 antennas, which can transmit at different MIMO ranks.

As can be seen from FIG. 2, the BER performance is significantly affected by the interference rank. For the case of rank 4 (201), an IRC receiver with 4 antennas can cancel only 3 strongest interferers, and the BER performance is about 6 dB worse than the case when the interfering base station is using rank 1 (203). Using rank 2 (202) is a little better than rank 4. The poor BER performance with high rank interference also indicates a lower output SINR ratio after IRC. In the system level, the low SINR leads to a poor throughput performance.

Thus, according to the described method and system or base station a time and/or frequency domain pattern for a MIMO rank adaptation in neighboring base stations is provided. It is shown in FIGS. 3 and 4 and is described in the following.

Neighboring base stations can agree to follow the same MIMO rank adaptation pattern. The pattern divides the time (FIG. 4)/frequency (FIG. 3) domain resources into several regions. Each region can support up to a certain MIMO rank.

Figure 3:
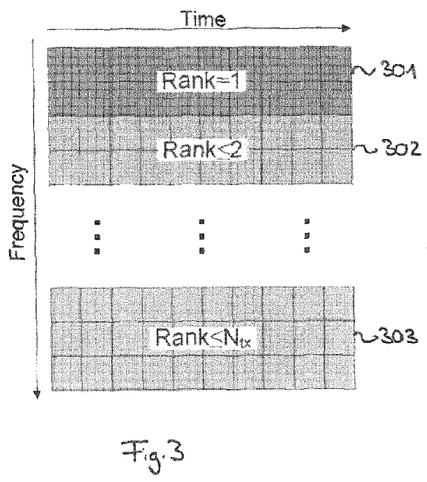
FIG. 3 shows a frequency domain coordination patter according to an exemplary embodiment of the present invention.
Figure 4:
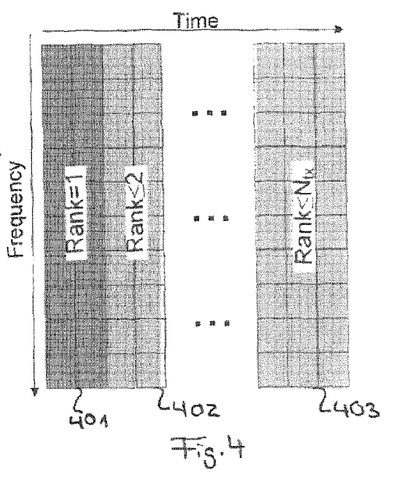
FIG. 4 shows a time domain coordination patter according to an exemplary embodiment of the present invention.

In FIG. 3, frequency resources 301 support rank 1, frequency resources 302 support up to rank 2 and frequency resources 303 support up to rank $N_{rx}$. In FIG. 4, time resources 401 support rank 1, time resources 402 support up to rank 2 and time resources 303 support up to rank $N_{rx}$. It should be noted that the resources do not have to be divided equally or symmetrically but can also be divided un-symmetrically. This may mean that a small part of frequencies is assigned to rank 1, wherein a greater part of frequencies is assigned to for instance rank 5. In each resource region, one base station should use MIMO rank that is not higher than what is supported according to the pattern.

This proposal may provide the following benefits:
- Cell-edge UEs have poor channel quality and support only low MIMO ranks. Meanwhile, they are more vulnerable to inter-cell interference than cell-center UEs. By forcing neighboring cells to use the same resources for low rank transmission, it can be ensured that cell-edge UEs always experience low rank interference. Therefore, the gain of IRC is preserved.
- The cell-center UEs are less affected by inter-cell interference. The IRC gain is marginal for these users. They support high rank transmission and can be scheduled when neighboring cells are using high rank transmission.
- In a resource region supporting up to rank k, a base station can still benefit from MIMO rank adaptation between rank 1 and k. UEs with poor channel quality may still be served in resources allowing high rank transmission. This avoids the risk of unutilized resources if most of the UEs have poor channel quality.

Figure 5:
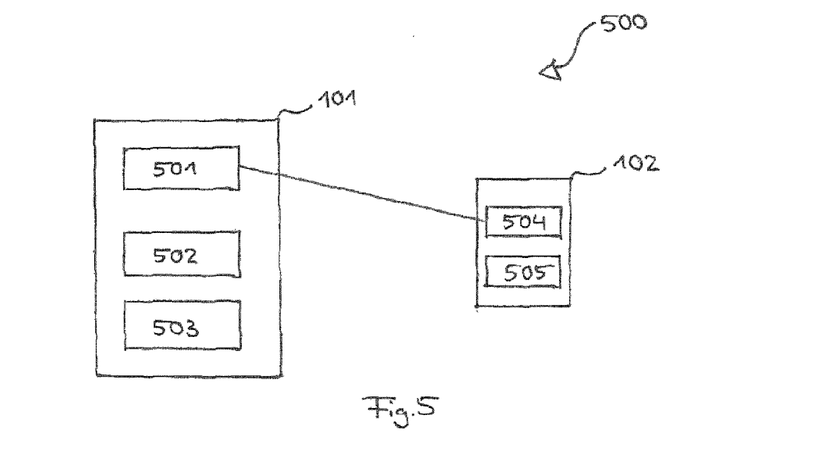
FIG. 5 shows a base station and a user equipment within a cellular network system according to an exemplary embodiment of the invention.

FIG. 5 shows a cellular network system 500 according to an exemplary embodiment of the invention. The cellular network system comprises a base station 101 and a user equipment 102 being served by the base station.

The base station may be any type of access point or point of attachment, which is capable of providing a wireless access to a cellular network system. Thereby, the wireless access may be provided for the user equipment or for any other network element, which is capable of communicating in a wireless manner. The base station may be an eNodeB, eNB, home NodeB or HNB, or any other kind of access point.

The base station may comprise a receiving unit, for example a receiver as known by a skilled person. The base station may also comprise a transmitting or sending unit, for example a transmitter. The receiver and the transmitter may be implemented as one single unit, for example as a transceiver 501. The transceiver or the receiving unit and the sending unit may be adapted to communicate with the user equipment via an antenna.

In the context of this description, the base station may comprise more than one antenna to be able to support MIMO transmissions. MIMO rank adaptation may be employed at the transmitter side (of the base station) as part of the link adaptation process to make best use of the multiple transmit antennas. If the user equipment (UE) channel quality is good, multiple data streams could be sent to the UE using high rank transmission. If the channel is poor, a low transmission rank may exploit the MIMO diversity gain to improve the received signal to interference plus noise ratio (SINR). At the receiver side (of the base station), the SINR can be improved by combining the signals from multiple receiving antennas. An IRC (interference rejection combining) receiver may exploit the interference correlation across the receiving antennas to suppress the strongest interferers and maximize the SINR. It may effectively experience each MIMO rank as one independent interference source. Therefore, its performance may be significantly penalized when high rank transmissions are applied at interfering eNBs.

The receiver of the base station may be such an IRC receiver. An IRC receiver with $N_{rx}$ antennas can ideally suppress up to $N_{rx}-1$ strongest interferers. If rank 1 transmission is used in all neighboring cells, the interference from $N_{rx}-1$ neighboring base stations can be suppressed. However, if neighboring cells are using high rank transmission, one interferer corresponds to one MIMO data-stream, and the IRC receiver can suppress interference from only $(N_{rx}-1)/N_{rank}$ neighboring stations.

To reduce these negative effects, the base station comprises a control unit 502 being adapted to divide the plurality of channel resources into a set of channel resource regions, being adapted to assign a multiple input multiple output rank to each channel resource region, wherein the multiple input multiple output rank is indicative for a number of channel resources to be used for transmission within a corresponding channel resource region, and being adapted to select a channel resource region for the transmission between the base station and the user equipment.

The base station further comprises a managing unit 503 being adapted to manage the transmission between the base station and the user equipment based on the selected channel resource region and the corresponding assigned multiple input multiple output rank. The control unit and the managing unit may be implemented as single units or may be implemented for example as part of a standard control unit, like a CPU or a microcontroller.

The user equipment (UE) may be any type of communication end device, which is capable of connecting with the described base station. The UE may be in particular a cellular mobile phone, a Personal Digital Assistant (PDA), a notebook computer, a printer and/or any other movable communication device.

The user equipment may comprise a receiving unit or receiver which is adapted for receiving signals from the base station. The user equipment may comprise a transmitting unit for transmitting signals. The transmitting unit may be a transmitter as known by a skilled person. The receiver and the transmitting unit may be implemented as one single unit, for example as a transceiver 504. The transceiver or the receiver and the transmitting unit may be adapted to communicate with the base station via an antenna.

As described in the context of the base station, the UE may support MIMO transmissions. The receiver of the UE may thus also be an IRC receiver.

The user equipment may comprise a configuration unit 505 for configuring the transmission based on information received from the base station. Such a configuration unit may be adapted to configure the user equipment to transmit according to the selected MIMO rank in the corresponding channel resource regions. The configuration unit of the user equipment may be implemented for example as part of a control unit, like a CPU or a microcontroller. The configuration unit and the transceiver may be coupled or may be implemented as one single unit.

Having regard to the subject matter disclosed herein, it should be mentioned that, although some embodiments refer to a "base station", "eNB", etc., it should be understood that each of these references is considered to implicitly disclose a respective reference to the general term "network component" or, in still other embodiments, to the term "network access node". Also other terms which relate to specific standards or specific communication techniques are considered to implicitly disclose the respective general term with the desired functionality.

It should further be noted that a base station as disclosed herein is not limited to dedicated entities as described in some embodiments. Rather, the herein disclosed subject matter may be implemented in various ways in various locations in the communication network while still providing the desired functionality.

According to embodiments of the invention, any suitable entity (e.g. components, units and devices) disclosed herein, e.g. the determination unit, are at least in part provided in the form of respective computer programs which enable a processor device to provide the functionality of the respective entities as disclosed herein. According to other embodiments, any suitable entity disclosed herein may be provided in hardware. According to other—hybrid—embodiments, some entities may be provided in software while other entities are provided in hardware.

It should be noted that any entity disclosed herein (e.g. components, units and devices) are not limited to a dedicated entity as described in some embodiments. Rather, the herein disclosed subject matter may be implemented in various ways and with various granularity on device level while still providing the desired functionality. Further, it should be noted that according to embodiments a separate entity (e.g. a software module, a hardware module or a hybrid module) may be provided for each of the functions disclosed herein. According to other embodiments, an entity (e.g. a software module, a hardware module or a hybrid module (combined software/hardware module)) is configured for providing two or more functions as disclosed herein.

It should be noted that the term "comprising" does not exclude other elements or steps. It may also be possible in further refinements of the invention to combine features from different embodiments described herein above. It should also be noted that reference signs in the claims should not be construed as limiting the scope of the claims.

LIST OF REFERENCE SIGNS

100 Cellular network system
101 Base station
102 User equipment
103 Communication channel
201 BER in case of rank 4 transmission
202 BER in case of rank 3 transmission
203 BER in case of rank 4 transmission
301 Channel resource region for rank 1
302 Channel resource region for up to rank 2
303 Channel resource region for up to rank $N_{tx}$
401 Channel resource region for rank 1
402 Channel resource region for up to rank 2
403 Channel resource region for up to rank $N_{tx}$
500 Cellular network system
501 Transceiver of base station
502 Control unit of base station
503 Management unit of base station
504 Transceiver of user equipment
506 Configuration unit of user equipment

The invention claimed is:

1. A method for managing a radio transmission in a cellular network between a base station and a user equipment, wherein a communication channel is used for the radio transmission, wherein the communication channel comprises a plurality of channel resources and is based on a multiple input multiple output transmission scheme, the method comprising dividing the plurality of channel resources into a set of channel resource regions based on a frequency and/or time domain pattern, assigning a multiple input multiple output rank to each channel resource region, wherein the multiple input multiple output rank is indicative for a number of channel resources to be used for a radio transmission within a corresponding channel resource region, selecting a channel resource region for the radio transmission between the base station and the user equipment, and managing the radio transmission between the base station and the user equipment based on the selected channel resource region and the corresponding assigned multiple input multiple output rank, wherein the base station uses the same frequency and/or time domain pattern as a neighboring base station such that a given channel resource region is assigned the same multiple input multiple output rank by the base station as the neighboring base station based on the same frequency and/or time domain pattern.

2. The method as set forth in claim 1, wherein, within a channel resource region, a multiple input multiple output rank is used for a radio transmission being equal to or being lower than the multiple input multiple output rank being assigned to the channel resource region.

3. The method as set forth in claim 1, wherein selecting a channel resource region for the radio transmission between the base station and the user equipment comprises determining a channel condition of the communication channel between the base station and the user equipment, and selecting a multiple input multiple output rank based on the determined channel condition.

4. The method as set forth in claim 1, the method further comprising exchanging a signal between the base station and the neighboring base station, wherein the signal comprises information of the set of channel resource regions and the corresponding multiple input multiple output ranks.

5. The method as set forth in claim 4, the method further comprising managing a radio transmission between the neighboring base station and a further user equipment based on the received information.

6. The method as set forth in claim 4, the method further comprising determining a channel condition of the communication channel between the neighboring base station and the further user equipment, and selecting a multiple input multiple output rank based on the determined channel condition, wherein, in case the selected multiple input multiple output rank is assigned to the same channel resource region being selected for the radio transmission between the base station and the user equipment, managing the radio transmission between the neighboring base station and the further user equipment comprises using the same channel resource region as selected for the radio transmission between the base station and the user equipment.

7. The method as set forth in claim 4, wherein X2 signalling is used for exchanging the signal between the base station and the neighboring base station.

8. The method as set forth in claim 1, the method further comprising determining an actual load of the selected channel resource region, and if the actual load is above a predefined threshold, selecting a different channel resource region, to which a higher multiple input multiple output rank than the multiple input multiple output rank of the selected channel resource region is assigned.

9. A base station for managing a radio transmission in a cellular network system between the base station and a user equipment, wherein a communication channel is used for the radio transmission, wherein the communication channel comprises a plurality of channel resources and is based on a multiple input multiple output transmission scheme, the base station comprising a control unit being adapted to divide the plurality of channel resources into a set of channel resource regions based on a frequency and/or time domain pattern, being adapted to assign a multiple input multiple output rank to each channel resource region, wherein the multiple input multiple output rank is indicative for a number of channel resources to be used for a radio transmission within a corresponding channel resource region, and being adapted to select a channel resource region for the radio transmission between the base station and the user equipment, and a managing unit being adapted to manage the radio transmission between the base station and the user equipment based on the selected channel resource region and the corresponding assigned multiple input multiple output rank, wherein the base station uses the same frequency and/or time domain pattern as a neighboring base station such that a given channel resource region is assigned the same multiple input multiple output rank by the base station as the neighboring base station based on the same frequency and/or time domain pattern.

10. A user equipment being adapted to communicate with the base station as set forth in claim 9.

11. A cellular network system, the cellular network system comprising a base station as set forth in claim 10.

* * * * *